US012679528B2

(12) United States Patent
Becquet et al.

(10) Patent No.: US 12,679,528 B2
(45) Date of Patent: Jul. 14, 2026

(54) METHOD AND ELECTROHYDRAULIC SYSTEM FOR CONTROLLING A RETRACTABLE LANDING GEAR OF AN AIRCRAFT, LANDING GEAR AND AIRCRAFT

(71) Applicant: AIRBUS HELICOPTERS, Marignane Cedex (FR)

(72) Inventors: Roland Becquet, Meyreuil (FR);
Grégory Basset, Martigues (FR);
Thomas Grondin, Eyguieres (FR);
Antonin Rocher, Ensues-la-Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 19/329,355

(22) Filed: Sep. 15, 2025

(65) Prior Publication Data

US 2026/0145785 A1     May 28, 2026

(30) Foreign Application Priority Data

Nov. 28, 2024     (FR) ................................. FR2413147

(51) Int. Cl.
*B64C 25/22*          (2006.01)
*B64C 25/26*          (2006.01)
(Continued)

(52) U.S. Cl.
CPC .............. *B64C 25/22* (2013.01); *B64C 25/26* (2013.01); *B64C 25/44* (2013.01); *B64C 2025/325* (2013.01)

(58) Field of Classification Search
CPC ......... B64C 25/22; B64C 25/26; B64C 25/30; B64C 25/426
See application file for complete search history.

(56) References Cited

U.S. PATENT DOCUMENTS

| | | | | |
|---|---|---|---|---|
| 4,792,192 A | * | 12/1988 | Tveitane | B64C 25/42 |
| | | | | 244/111 |
| 8,038,094 B2 | * | 10/2011 | Oyama | B64C 25/22 |
| | | | | 244/99.6 |
| 2005/0194495 A1 | * | 9/2005 | Seung | B64C 25/44 |
| | | | | 244/111 |

FOREIGN PATENT DOCUMENTS

| | | |
|---|---|---|
| EP | 4006360 A1 | 6/2022 |
| FR | 2312560 A1 | 12/1976 |

(Continued)

OTHER PUBLICATIONS

French Search Report for French Application No. FR2413147, Completed by the French Patent Office, Dated Jun. 17, 2025, 12 pages.

*Primary Examiner* — Richard Green
(74) *Attorney, Agent, or Firm* — BROOKS KUSHMAN P.C.

(57)          ABSTRACT

An electrohydraulic system for controlling a landing gear of an aircraft, said landing gear comprising a plurality of retractable landing gear units each provided with at least one wheel. Said system comprises two braking devices for braking said wheel of two landing gear units, one movement device per landing gear unit for moving a landing gear unit relative to a housing of said aircraft, and two hydraulic units, hydraulically connected to said movement devices and to at least one of said braking devices. Each hydraulic unit comprises a reservoir containing a fluid, a pump driven by an electric pump motor and a distributor configured to distribute said fluid to said at least one braking device and to said movement devices, by means of braking, extension, retraction and discharge valves.

14 Claims, 7 Drawing Sheets

(51)  Int. Cl.
    *B64C 25/44*        (2006.01)
    *B64C 25/32*        (2006.01)

(56)                References Cited

FOREIGN PATENT DOCUMENTS

| FR | 3147604 A1 | * | 10/2024 | ............. | B64C 25/22 |
| GB | 757705 A | * | 9/1956 | ............. | B64C 25/22 |
| GB | 2626551 A | * | 7/2024 | ............. | B64C 25/22 |

* cited by examiner

METHOD AND ELECTROHYDRAULIC SYSTEM FOR CONTROLLING A RETRACTABLE LANDING GEAR OF AN AIRCRAFT, LANDING GEAR AND AIRCRAFT

CROSS REFERENCE TO RELATED APPLICATION

This application claims priority to French patent application No. FR 24 13147 filed on Nov. 28, 2024, the disclosure of which is incorporated in its entirety by reference herein.

TECHNICAL FIELD

The present disclosure is in the field of aircraft landing gear, and in particular landing gear having retractable landing gear units.

BACKGROUND

The present disclosure relates to an electrohydraulic system for controlling a retractable landing gear of an aircraft, as well as to such a retractable landing gear and an aircraft. The present disclosure also relates to a method of controlling such an electrohydraulic system.

An aircraft may comprise a landing gear provided with a plurality of retractable landing gear units each comprising at least one wheel. Thus, an aircraft, for example a rotorcraft, may comprise two main landing gear units and one auxiliary landing gear unit, each comprising one or more wheels.

Such an aircraft further comprises a hydromechanical movement system in order, firstly, to retract the landing gear units at least partially into housings of an airframe of the aircraft during flight and, secondly, to extend the landing gear units at least partially from their respective housings for landing.

Such an aircraft also comprises a hydromechanical braking system acting simultaneously on one or more landing gear units. For example, a braking system may act on the wheels of the two main landing gear units.

The movement system and the braking system are generally hydraulic. The generation of the hydraulic power supplying these two systems is generally centralized and shared with other equipment of the aircraft, such as flight controls in particular. Such centralization requires the use of a large number of hydraulic lines and a large number of solenoid valves, in order to individually and independently control this equipment. These solenoid valves may be distributed at various locations in the aircraft, and are then electrically supplied by a network of electrical harnesses running through the aircraft.

The braking system may also comprise an accumulator to maintain sufficient pressure in the braking system and thus allow the aircraft to be immobilized on a parking area when the power generation device is not operating.

In addition, the regulations require that the movement system be connected to at least two separate power generation devices for safety reasons. The movement system can thus be hydraulically supplied, firstly by a centralized power generation device, and secondly by a complementary or emergency power generation device dedicated to this movement system.

Document EP 4006360 presents an alternative architecture and describes a hydraulic system intended to supply the main landing gear of an aircraft provided with a right landing gear unit and a left landing gear unit. The system comprises two hydraulic units, a first hydraulic unit supplying the right landing gear unit and a second hydraulic unit supplying the left landing gear unit. Each hydraulic unit comprises a fluid reservoir and a pump driven by an electric motor. The system comprises a system of emergency valves allowing one of the hydraulic units to supply both the left and right landing gear units, in particular in the event of breakdown of the other unit.

Documents US 2005/0194495 and GB 2626551 are also known.

SUMMARY

An object of the present disclosure is therefore to propose an alternative and innovative solution for providing a combined system for moving and braking a retractable landing gear that is hydraulically autonomous and independent of the hydraulic power of the aircraft, and that complies with the regulations.

The present disclosure relates to an independent and autonomous electrohydraulic control system for a retractable landing gear of an aircraft making it possible firstly to extend and retract the landing gear and secondly to brake its wheels.

The present disclosure also relates to a method for controlling such an electrohydraulic system for controlling a retractable landing gear.

An object of the present disclosure is firstly an electrohydraulic system for controlling an aircraft landing gear, the landing gear comprising a plurality of retractable landing gear units each provided with at least one wheel.

The system comprises:

at least two braking devices for braking said at least one wheel of at least two landing gear units;

a movement device per landing gear unit for moving one landing gear unit relative to a housing of the aircraft; and two hydraulic units, each of the two hydraulic units being hydraulically connected to the movement devices and to at least one of the braking devices, each hydraulic unit comprising a reservoir containing a fluid, as well as a pump driven by an electric pump motor, and a distributor configured to distribute the fluid to said at least one braking device and to the movement devices.

The electrohydraulic system according to the disclosure comprises at least two braking devices for braking the wheels of at least two respective landing gear units, and a plurality of movement devices, each configured to retract a landing gear unit into a housing of an airframe of the aircraft in flight, and to extend it for landing of the aircraft. Each of the hydraulic units is hydraulically connected to the movement devices and to at least one of the braking devices, via lines. The two hydraulic units are substantially, if not strictly, identical.

The electrohydraulic system according to the disclosure thus makes it possible to control the braking of the landing gear units of an aircraft as well as their extensions and retractions, autonomously and independently of a centralized hydraulic power of the aircraft. The electrohydraulic system according to the disclosure can thus be installed as close as possible to the landing gear units, facilitating and simplifying its installation, while complying with the regulations relating to the redundancy of the hydraulic supply for extension and retraction functions of the landing gear units.

The hydraulic and electrical networks can be simplified. The disclosure may then reduce the bulk and/or the mass of the system, and/or to improve its reliability and limit the risks of breakdowns, such as leaks for example.

In addition, the simultaneous supply of the movement devices by the two hydraulic units makes it possible, in accordance with the regulations, to compensate for the failure of one of the units, the still operational unit, by itself, supplying the movement devices. To this end, each reservoir may be sized to contain the volume of fluid necessary to supply, by itself, the two movement devices.

Finally, since the braking function on the one hand, and the extension and retraction functions on the other hand, are not implemented during the same flight phase, the hydraulic units can be optimized, which also contributes to reducing their mass and dimensions.

The electrohydraulic system according to the disclosure may comprise one or more of the following features, taken individually or in combination.

According to one possibility, the electrohydraulic system according to the disclosure may comprise only two braking devices, hydraulically supplied by the two hydraulic units respectively. Each braking device is thus hydraulically supplied by a single hydraulic unit, and each hydraulic unit hydraulically supplies a single braking device.

Each braking device is thus supplied by a dedicated hydraulic unit. The braking of one landing gear unit may be achieved independently of the braking of another landing gear unit. Differential braking of the two braking devices can advantageously be achieved by means of different hydraulic supplies respectively generated by the two hydraulic units.

Alternatively, the electrohydraulic system may comprise only two braking devices hydraulically supplied jointly by the two hydraulic units. Each braking device is thus hydraulically supplied by the two hydraulic units.

By sharing the two hydraulic units for the braking function, the reliability of this braking function is improved. Indeed, the braking remains identical and symmetrical, in particular performed on the two landing gear units, including in the event of failure of one of the hydraulic units.

Alternatively, the electrohydraulic system may comprise as many braking devices as landing gear units, all the landing gear units of the landing gear then being associated with a braking device. In this case, each braking device may be hydraulically supplied by a single hydraulic unit or jointly by the two hydraulic units.

According to another possibility compatible with the preceding possibilities, the landing gear may comprise three landing gear units, for example two main landing gear units and one auxiliary landing gear unit, and the two hydraulic units may be hydraulically connected to the movement devices associated with the three landing gear units.

Alternatively, the landing gear may comprise at least two main landing gear units and one retractable auxiliary landing gear unit. The two hydraulic units can then be hydraulically connected to the movement devices associated with the main landing gear units and the system can comprise an auxiliary movement device associated with the retractable auxiliary landing gear unit. For example, this auxiliary movement device may comprise an electric movement motor.

In addition, an aircraft may comprise a non-retractable complementary landing gear unit, independent of the landing gear.

According to another possibility compatible with the preceding possibilities, the movement devices may each comprise a piston secured to a rod and a hollow cylinder, the cylinder comprising an extension chamber and a retraction chamber separated by the piston. In this case, the distributor of each of the hydraulic units may comprise:

a braking valve, hydraulically connected to the pump of this hydraulic unit and to at least one of the braking devices, for distributing the fluid contained in the reservoir of this hydraulic unit to said at least one braking device;

an extension valve, hydraulically connected to the pump of this hydraulic unit and to the extension chambers of the movement devices, in order to distribute the fluid contained in the reservoir of this hydraulic unit into the extension chambers;

a retraction valve, hydraulically connected to the pump of this hydraulic unit and to the retraction chambers of the movement devices, in order to distribute the fluid contained in the reservoir of this hydraulic unit into the retraction chambers;

a first discharge valve, hydraulically connected to the reservoir of this hydraulic unit and to the extension chambers of the movement devices, in order to discharge the fluid contained in the extension chambers into the reservoir of this hydraulic unit; and a second discharge valve, hydraulically connected to the reservoir of this hydraulic unit and to the retraction chambers of the movement devices, in order to discharge the fluid contained in the retraction chambers into the reservoir of this hydraulic unit.

In addition, since the two hydraulic units simultaneously supply the extension or retraction chambers of the various movement devices and receive the fluid discharged from these extension and retraction chambers, an asymmetry in these supplies and these discharges may appear between the two hydraulic units, able to generate a significant difference in the amounts of hydraulic fluid contained in the reservoirs of these two hydraulic units after several extensions and retractions of the landing gear units. A combined use of the extension, retraction and discharge valves makes it possible to balance the amounts of fluid contained in each of these reservoirs.

In addition, the distributor may comprise four check valves associated in series with the extension, retraction and discharge valves, respectively. These valves may, for example, be attached to the valves or installed on the hydraulic lines connecting these valves respectively to the extension and retraction chambers.

The function of these valves is firstly to prevent a fluid supply flow leaving the extension or retraction valves from reaching the discharge valves, and secondly to prevent a fluid discharge flow leaving the extension or retraction chambers from reaching the extension or retraction valves.

The distributor may comprise a first electric control motor controlling the opening and closing of the braking valve only, and a second electric control motor controlling combined openings and closings of the extension, retraction and discharge valves. The use of two electric control motors ensures independence of the braking and extension/retraction functions of the landing gear units.

Alternatively, the distributor may comprise a single electric distribution motor controlling combined openings and closings of the braking, extension, retraction and discharge valves. The use of a single electric distribution motor makes it possible to limit the mass and size of the distributor and consequently of the hydraulic unit.

Another object of the present disclosure is an aircraft comprising a landing gear comprising at least two retractable landing gear units each provided with at least one wheel, the aircraft comprising an electrohydraulic control system as described above.

Finally, another object of the present disclosure is a method for controlling an electrohydraulic system as described above.

This method comprises the following steps:

supplying pressurized fluid to the distributor of each hydraulic unit, by means of said pump of said respective hydraulic unit;

extending said movement devices, the braking valves being closed, the extension valves and the second discharge valves being open, the retraction valves and said first discharge valves being closed;

supplying the braking devices, the braking valves being open, the extension and retraction valves being closed; and retracting the movement devices, the braking valves being closed, the retraction valves and the first discharge valves being open, the extension valves and the second discharge valves being closed.

For this purpose, the hydraulic system may be controlled by an avionics system of the aircraft or a calculator of the electrohydraulic system, a controller implementing this method.

In addition, in order to enable the aircraft to be immobilized on a parking area, parking braking is carried out, initially by activating the pumps of the hydraulic units, the braking valves being open, to increase the pressure of the fluid in the braking devices. Once a required pressure is reached, the braking valves are closed in order to keep the braking devices under the required pressure of the fluid, the pumps then being deactivated.

In addition, the method may comprise a post-extension balancing, carried out following the extension of the landing gear, in order to balance the amounts of fluid contained in the reservoirs, the distributors comprising four non-return valves respectively associated, in series, with said extension, retraction and discharge valves, as described above.

Post-extension balancing can comprise the following steps:

detecting a first hydraulic unit containing the largest amount of fluid from the hydraulic units, the other hydraulic unit being a second hydraulic unit;

activating the pump of this first hydraulic unit;

opening the extension valve and the second discharge valve of the first hydraulic unit and the first and second discharge valves of the second hydraulic unit;

closing the retraction valve and the first discharge valve of the first hydraulic unit and the extension and retraction valves of the second hydraulic unit;

detecting that the reservoirs of the first and second hydraulic units contain the same amount of fluid to within a margin; and deactivating the pump of the first hydraulic unit.

Similarly, the method may comprise post-retraction balancing, carried out following the retraction of the landing gear units, in order to balance the amounts of fluid contained in the reservoirs, the distributors comprising four non-return valves respectively associated, in series, with said extension, retraction and discharge valves, as described above.

Post-extension balancing can comprise the following steps:

detecting a first hydraulic unit containing the largest amount of fluid from the hydraulic units, the other hydraulic unit being a second hydraulic unit;

activating the pump of this first hydraulic unit;

opening the retraction valve and the first discharge valve of the first hydraulic unit and the first and second discharge valves of the second hydraulic unit;

closing the extension valve and the second discharge valve of the first hydraulic unit and the extension and retraction valves of the second hydraulic unit;

detecting that the reservoirs of the first and second hydraulic units contain the same amount of fluid to within a margin; and deactivating the pump of the first hydraulic unit.

These post-extension and post-retraction balancing steps can be carried out automatically or on the order of an operator, after the extension and retraction, respectively, of the landing gear units.

These steps enable the fluid to be distributed in a substantially equivalent manner between the two reservoirs of the two hydraulic units. It goes without saying that opening or closing a valve has no effect, if this valve was previously closed or opened respectively.

Advantageously, the extension chambers during the post-extension balancing and the retraction chambers during the post-retraction balancing are held under pressure in order to keep the landing gear units respectively extended or retracted, including in the case where they do not comprise locking devices.

Deactivating the pump of the first hydraulic unit stops the flow of fluid between the reservoirs, signifying the end of the transfer of fluid.

The detection steps mentioned may, for example, comprise the following steps:

measuring the amounts of fluid contained in said reservoirs of the two hydraulic units;

comparing these amounts;

determining the first hydraulic unit, said reservoir of which contains the most fluid; and determining that the reservoirs of the hydraulic units contain the same amount of fluid to within a margin.

Finally, following each of the steps of the method controlling the opening and closing of valves, the distributor can be put into a nominal configuration, during a step of putting all the valves into a nominal configuration, comprising:

closing the extension and retraction valves; and opening the braking valve and the first and second discharge valves.

This nominal configuration is carried out, for example, once the extension, retraction of the landing gear units or the balancing operations have been completed, or following the supplying to the braking devices. During or before this nominal configuration, the pumps of the two hydraulic units are deactivated.

BRIEF DESCRIPTION OF THE DRAWINGS

The disclosure and its advantages appear in greater detail from the following description of examples given by way of illustration with reference to the accompanying figures, wherein.

DETAILED DESCRIPTION

Elements present in more than one of the figures are given the same references in each of them.

Figure 1:
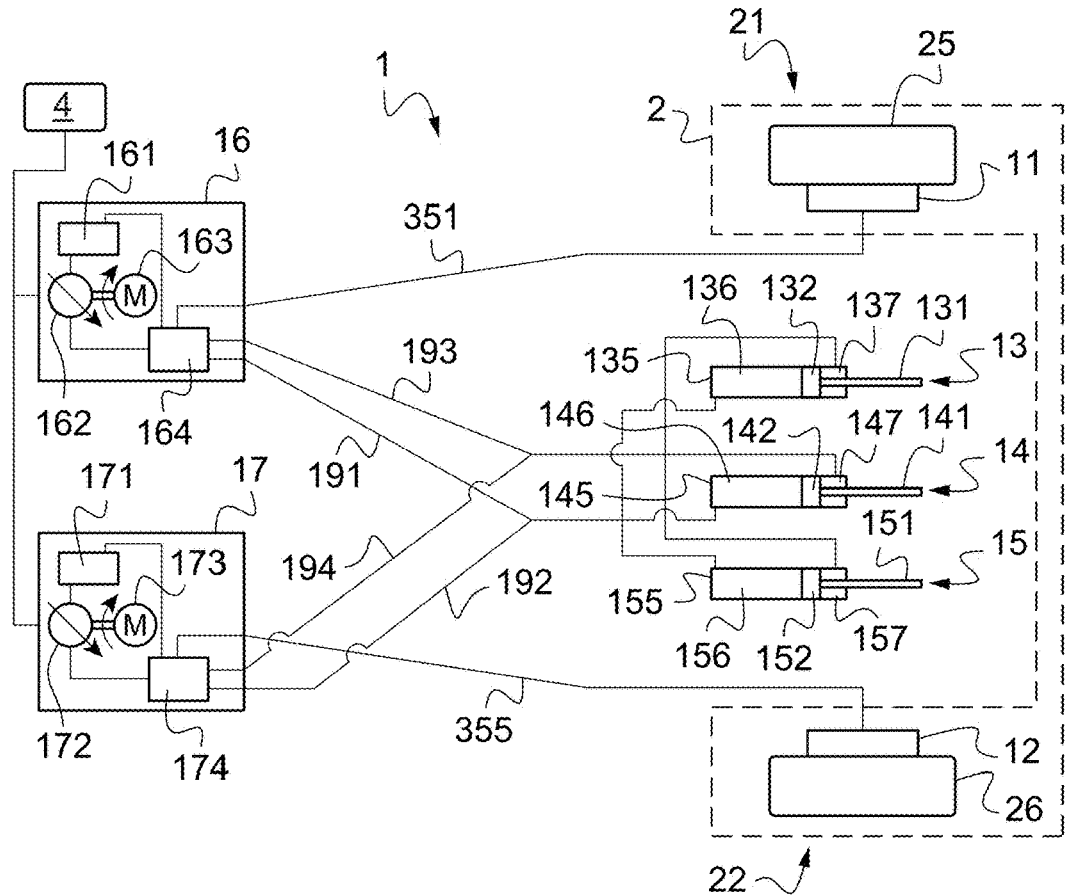
FIG. 1 shows a view of an electrohydraulic system for controlling a landing gear according to the disclosure.
Figure 2:
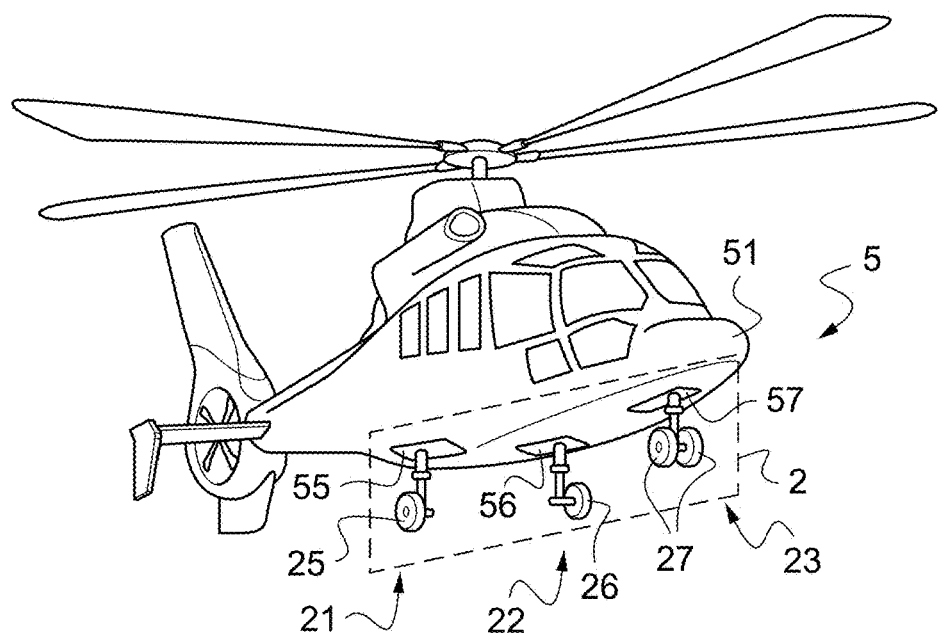
FIG. 2 shows a view of an aircraft equipped with an electrohydraulic system for controlling a landing gear according to the disclosure.

FIG. 1 shows an electrohydraulic system 1 for controlling a landing gear 2 of an aircraft 5. Such a landing gear 2 comprises a plurality of retractable landing gear units 21, 22, 23 each provided with one or more wheels 25, 26, 27. According to an example of a rotary wing aircraft 2 shown in FIG. 2, a landing gear 2 may comprise three landing gear units 21, 22, 23, including two main landing gear units 25, 26, optionally located in a rear area of the aircraft 2, and an auxiliary landing gear 27, optionally located in a front area of the aircraft 2. The three landing gear units 21, 22, 23 are retractable into respective housings 55, 56, 57 of an airframe 51 of the aircraft 2.

The electrohydraulic system 1 comprises at least two braking devices 11, 12 for braking the rotation of the wheel or wheels 25, 26, 27 of at least two landing gear units 21, 22, 23, each braking device 11, 12 acting on the wheel or wheels 25, 26, 27 of a single landing gear unit 21, 22, 23. Conventionally, such a braking device 11, 12 may comprise a disk or drum braking device, connected to the wheel or wheels of the landing gear unit 21, 22, 23.

The electrohydraulic system 1 also comprises one movement device 13, 14, 15 per landing gear unit 21,22,23, for moving a landing gear unit 21, 22, 23 relative to a housing 55, 56, 57. For example, each movement device 13, 14, 15 may comprise a hydraulic cylinder associated with a mechanical system provided with articulations allowing at least partial storage and extension of the landing gear unit 21, 22, 23 from its housing 55, 56, 57. Each movement device 13, 14, 15 may thus be provided with a piston 132, 142, 152 secured to a rod 131, 141, 151 and a hollow cylinder 135, 145, 155. The cylinder 135, 145, 155 may comprise an extension chamber 136, 146, 156 and a retraction chamber 137, 147, 157 separated by the piston 132, 142, 152, the rod 131, 141, 151 extending from the retraction chamber 137, 147, 157 of the cylinder 135, 145, 155.

Filling of the extension chamber 136, 146, 156 with a pressurized fluid makes it possible to move the piston 132, 142, 152 and the rod 131, 141, 151 towards the outside of the cylinder 135, 145, 155 in order to extend the wheel 25, 26, 27 of the landing gear 21, 22, 23 from its housing 55, 56, 57. Conversely, filling the retraction chamber 137, 147, 157 with a pressurized fluid enables the rod 131, 141, 151 to be retracted into the cylinder 135, 145, 155 in order to retract this landing gear unit 21, 22, 23 into its housing 55, 56, 57.

Reverse operation is also possible, with a movement of the rod of the movement device towards the outside of its cylinder causing the landing gear 21, 22, 23 to retract into its housing 55, 56, 57, and a movement of the rod 131, 141, 151 of the movement device towards the inside of its cylinder causing the landing gear 21, 22, 23 to extend from its housing 55, 56, 57.

The electrohydraulic system 1 also comprises two hydraulic units 16, 17. Each hydraulic unit 16, 17 comprises a reservoir 161, 171 containing a fluid, a pump 162, 172 driven by an electric pump motor 163, 173, and a distributor 164, 174 configured to distribute the fluid to said at least one braking device 11, 12 and to the movement devices 13, 14, 15.

Finally, the electrohydraulic system 1 comprises braking lines 351-353, 355, 356 hydraulically connecting each hydraulic unit 16, 17 to at least one of the braking devices 11, 12, and extension lines 191, 192 and retraction lines 193, 194 hydraulically connecting each hydraulic unit 16, 17 to the extension chambers 136, 146, 156 and retraction chambers 137, 147, 157 of the movement devices 13, 14, 15.

According to the exemplary electrohydraulic system 1 shown in FIG. 1, a first unit 16 is hydraulically connected to a first braking device 11, 12 by a first braking line 351 and a second unit 17 is hydraulically connected to a second braking device 12 by a second braking line 355. According to this example, the system 1 comprises two braking devices 11, 12 hydraulically supplied, respectively and independently, by the two hydraulic units 16, 17. In this case, differential braking of the two landing gear units 21, 22 is possible by differently hydraulically supplying the two braking devices 11, 12 respectively by the two hydraulic units 16, 17.

Figure 3:
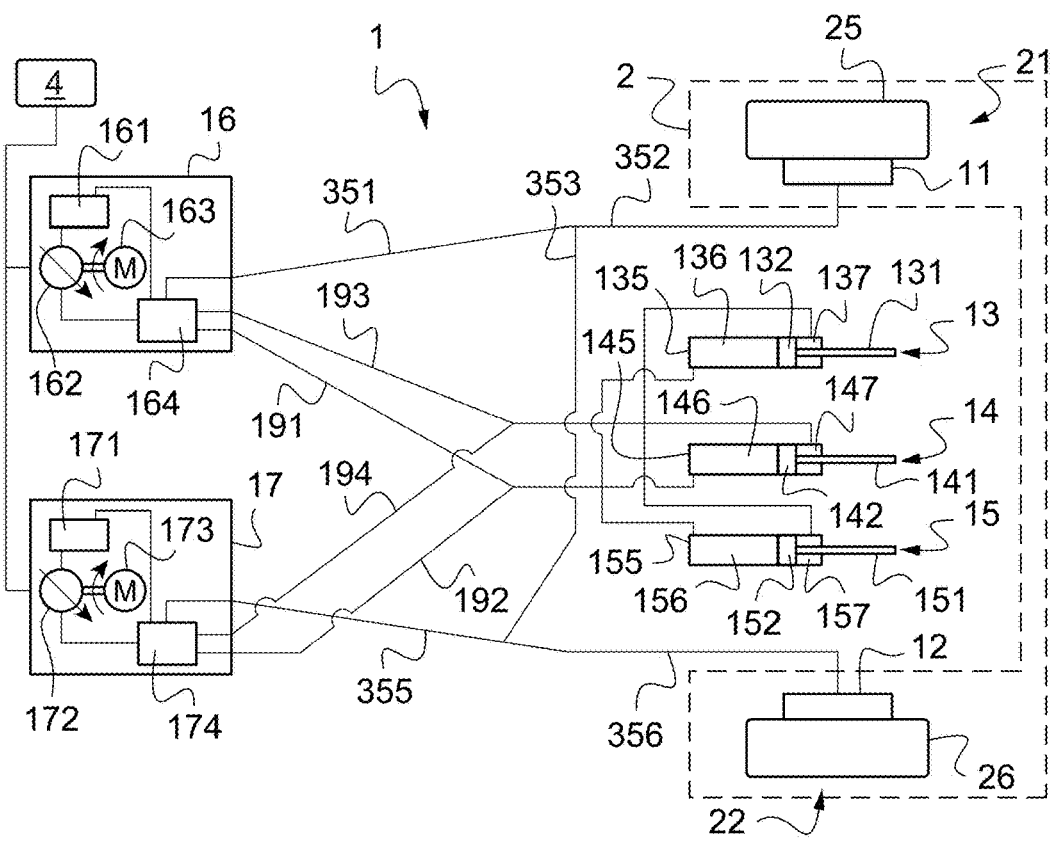
FIG. 3 shows a view of an electrohydraulic system for controlling a landing gear according to the disclosure.

According to another example shown in FIG. 3, the two units 16, 17 are hydraulically connected respectively to the two braking devices 11, 12. A first braking line 351 connects the first unit 16 to other braking lines 352, 353, 356 respectively supplying the two braking devices 11, 12. Similarly, a second braking line 355 connects the second unit 17 to the other braking lines 352, 353, 356 respectively supplying the two braking devices 11, 12. In this case, the system 1 comprises two braking devices 11, 12 hydraulically supplied jointly by the two hydraulic units 16, 17.

Moreover, and with reference to FIGS. 1 and 3, the two units 16, 17 are each hydraulically connected, to all the movement devices 13, 14, 15, by the two extension lines 191, 192 supplying their respective extension chambers 136, 146, 156 and by two retraction lines 193, 194 supplying their retraction chambers 137, 147, 157. According to the two examples shown, the landing gear 2 comprises three landing gear units 25, 26, 27, and the two hydraulic units 16, 17 are hydraulically connected to the three movement devices 13, 14, 15 associated respectively with the three landing gear units 25, 26, 27.

Figure 4:
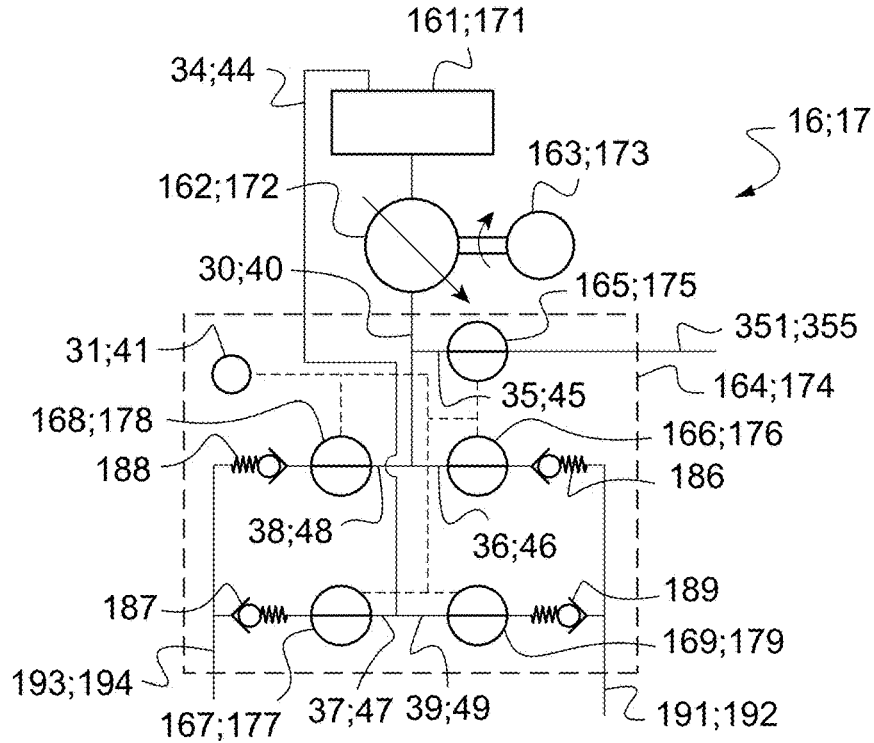
FIGS. 4 to 7, show views of a distributor of the electrohydraulic control system of a landing gear of FIG. 1.

FIGS. 4 to 9 detail the two hydraulic units 16, 17, as well as their operation. The distributors 164, 174 of the two units 16, 17 may be substantially or even strictly identical. The distributor 164, 174 of each of the units 16, 17 thus comprises, as shown in FIG. 4, a braking valve 165, 175, hydraulically connected to the pump 162, 172 of this unit 16, 17 by an internal braking line 35,45 of the distributor 164, 174 and to the braking line 351, 355 supplying at least one of the braking devices 11, 12.

The distributor 164, 174 of each of the units 16, 17 also comprises an extension valve 166, 176, hydraulically connected to the pump 162, 172 of this hydraulic unit 16, 17 by an internal extension line 36, 46 of the distributor 164, 174 and to the extension line 191, 192 connected to the extension chambers 136, 146, 156 of the movement devices 13, 14, 15.

The distributor 164, 174 of each of the units 16, 17 also comprises a retraction valve 168, 178, hydraulically connected to the pump 162, 172 of this hydraulic unit 16, 17 by an internal retraction line 38, 48 of the distributor 164, 174 and to the retraction line 193, 194 connected to the retraction chambers 137, 147, 157 of the movement devices 13, 14, 15.

A supply line 30, 40 can connect the internal braking lines 35, 45, extension lines 36, 46 and retraction 38, 48 lines to the pump 162, 172.

The distributor 164, 174 of each of the units 16, 17 further comprises a first discharge valve 169, 179, hydraulically connected to the reservoir 161, 171 of this hydraulic unit 16, 17 by a first internal discharge line 39, 49 of the distributor 164, 174 and to the extension line 191, 192 connected to the extension chambers 136, 146, 156 of the movement devices 13, 14, 15. A return line 34, 44 can connect the first internal discharge line 39, 49 to the reservoir 161, 171.

The distributor 164, 174 of each of the units 16, 17 finally comprises a second discharge valve 167, 177, hydraulically connected to the reservoir 161, 171 of this hydraulic unit 16, 17 by a second internal discharge line 37, 47 of the distributor 164, 174 and to the retraction line 193, 194 connected to the retraction chambers 137, 147, 157 of the movement devices 13, 14, 15. The return line 34, 44 can connect the second internal discharge line 37, 47 to the reservoir 161, 171.

The distributor 164, 174 may comprise, as shown in FIGS. 4 to 7, a single electric distribution motor 31, 41 controlling combined openings and closures of the braking, extension, retraction and discharge valves 165-169, 175-179. For example, the electric distribution motor 31, 41 may comprise an elongated rotor. Axial portions of this rotor correspond respectively to the braking, extension, retraction and discharge valves 165-169,175-179. Each axial portion comprises one or more recesses, the angular positions of which about the axis of rotation of the rotor may be different such that particular angular positions of the rotor about its axis of rotation correspond to a combined opening of one or more of these valves, the other valves being closed.

For example, for a first particular angular position of the rotor about its axis of rotation, the recess of the axial portion corresponding to the braking valve 165, 175 allows a passage of fluid between the internal braking line 35, 45 and the braking line 351, 352 while the recesses of the other axial portions corresponding to the extension, retraction and discharge valves 166-169, 176-179 prevent any passage of fluid. For a second particular angular position, the recesses of the axial portions corresponding to the extension valve 166, 176 and to the second discharge valve 167, 177 allow a passage of fluid firstly between the internal extension line 36, 46 and the extension line 191, 192 and secondly between the second internal discharge line 37, 47 and the retraction line 193, 194, while the recesses of the other axial portions corresponding to other braking valves 165, 175, retraction valves 168, 178 and to the first discharge valves 169, 179 prevent any passage of fluid.

For example, the distribution electric motor 31, 41 may be an electric stepper motor for accurately controlling the angular position of the rotor.

Figure 8:
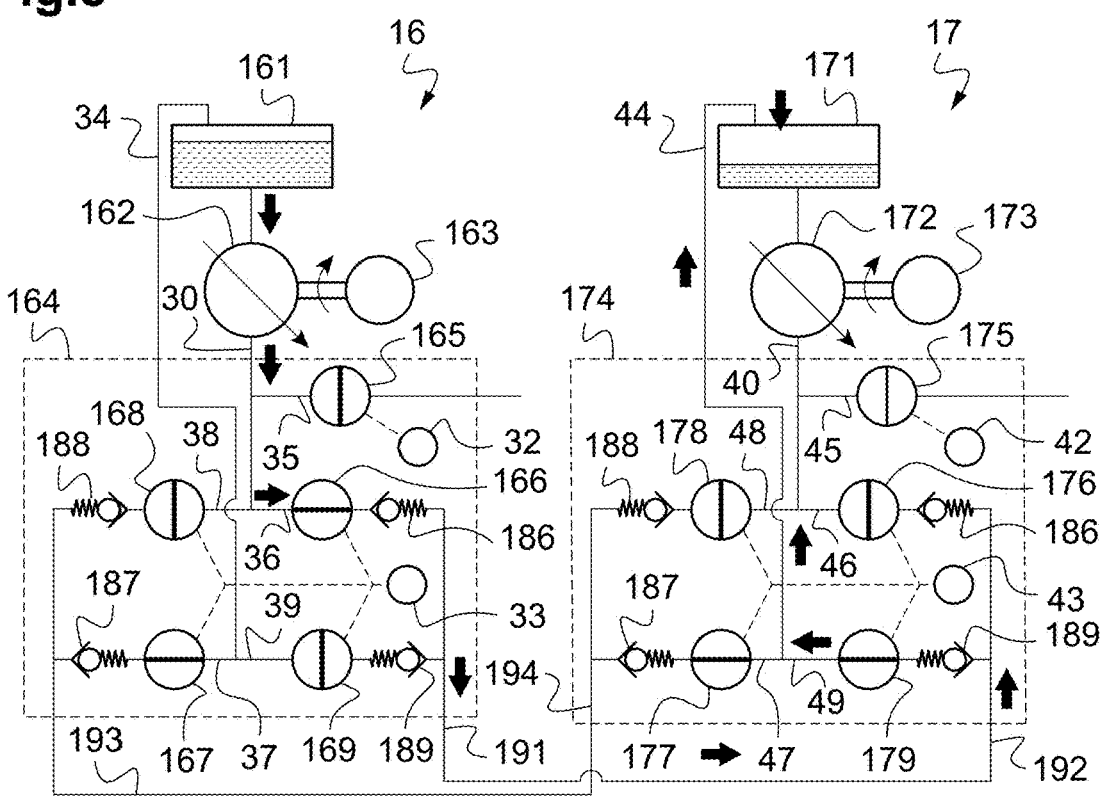
FIGS. 8 and 9, show views of the distributors of an electrohydraulic system for controlling a landing gear according to the disclosure.
Figure 9:
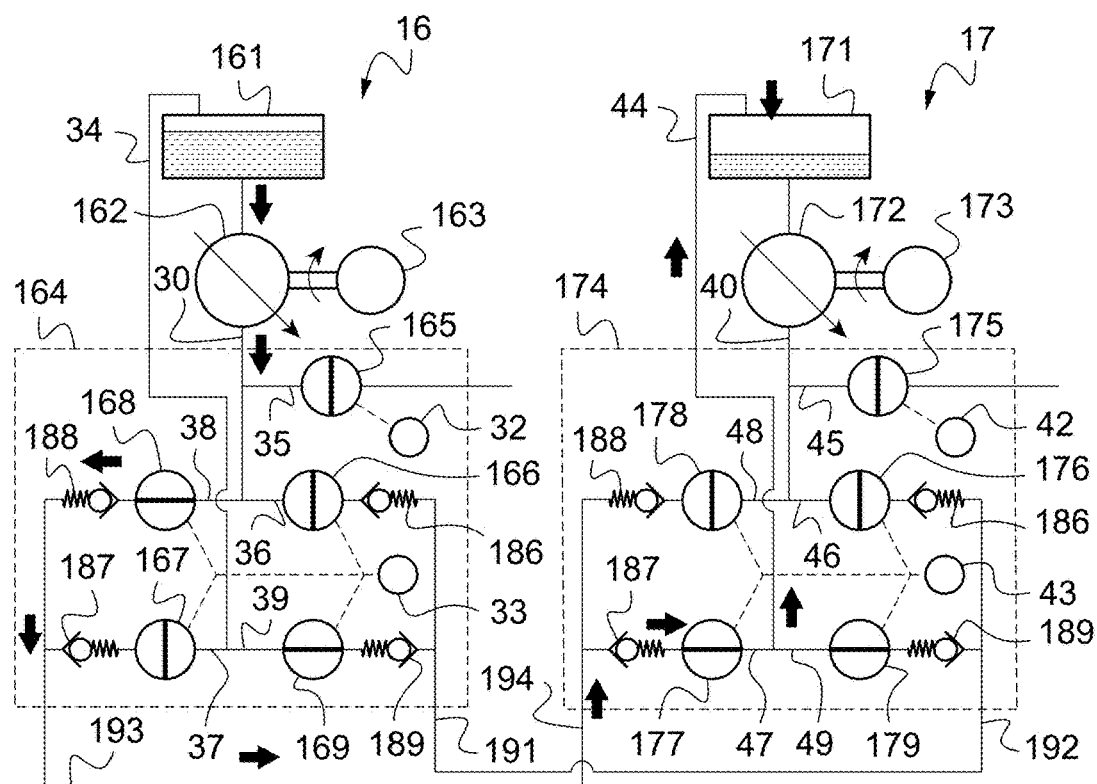

Alternatively, as shown in FIGS. 8 and 9, the distributor 164, 174 may comprise a first electric control motor 32, 42 controlling opening and closing of the braking valve 165, 175 and a second electric control motor 33, 43 controlling combined openings and closings of the extension, retraction and discharge valves 166-169,176-179. The second control electric motor 32, 42 may be substantially similar to the electric distribution motor 31, 41.

Optionally, the distributor 164, 174 of each of the units 16, 17 may comprise four non-return valves 186-189 arranged respectively between the extension, retraction and discharge valves 166-169,176-179 and the corresponding extension 191, 192 and retraction 193, 194 lines.

A first valve 186 is arranged between the extension valve 166, 176 and the extension line 191, 192 in order, firstly, to allow the passage of the fluid from the extension valve 166, 176 to the extension chambers 136, 146, 156 and, secondly, to prevent the discharge of the fluid from the extension chamber 136, 146, 156 to the extension valve 166, 176.

A second valve 188 is arranged between the retraction valve 168, 178 and the retraction line 193,194 in order, firstly, to allow the passage of the fluid from the retraction valve 168, 178 to the retraction chambers 137, 147, 157 and, secondly, to prevent the discharge of the fluid from the retraction chamber 137, 147, 157 to the retraction valve 168, 178.

A third valve 189 is arranged between the first discharge valve 169, 179 and the extension line 191, 192 in order, firstly, to prevent the passage of fluid from the first discharge valve 169, 179 to the extension chambers 136, 146, 156 and, secondly, to allow the discharge of fluid from the extension chamber 136, 146, 156 to the first discharge valve 169, 179.

A fourth valve 187 is arranged between the second discharge valve 167, 177 and the retraction line 193, 194 in order, firstly, to prevent the passage of fluid from the second discharge valve 167, 177 to the retraction chambers 137, 147, 157 and, secondly, to allow the discharge of the fluid from the retraction chamber 137, 147, 157 to the second discharge valve 167, 177.

Each hydraulic unit 16, 17 can be controlled by a controller 4 formed by a calculator of the electrohydraulic system 1 or an avionics system of the aircraft 2. The controller 4 may be connected to the hydraulic units 16, 17 by a wired or wireless link. Alternatively, each hydraulic unit 16, 17 may have its own controller 4. The controller 4 can transmit to each hydraulic unit 16, 17 digital or analogue, electrical or optical signals to control the pump 161, 171 as well as the distributor 164, 174 and, in particular, combined openings and closures of the various braking, extension, retraction and discharge valves 165-169, 175-179.

The controller 4 is connected, in particular, to at least one human-machine interface for braking control, for example a pedal and/or a parking brake control. The controller 4 is also connected to a human-machine interface for controlling the extension and retraction of the landing gear units 21, 22, 23. The controller 4 may also be connected to the avionics system of the aircraft 2 to enable the display of messages, for example, relating to a failure concerning at least one of the hydraulic units 16, 17, or relating to a request for a braking test before landing, or relating to maintenance of one of the hydraulic units 16, 17, of one of the braking devices 11, 12 or of the movement devices 13, 14, 15.

Figure 10:
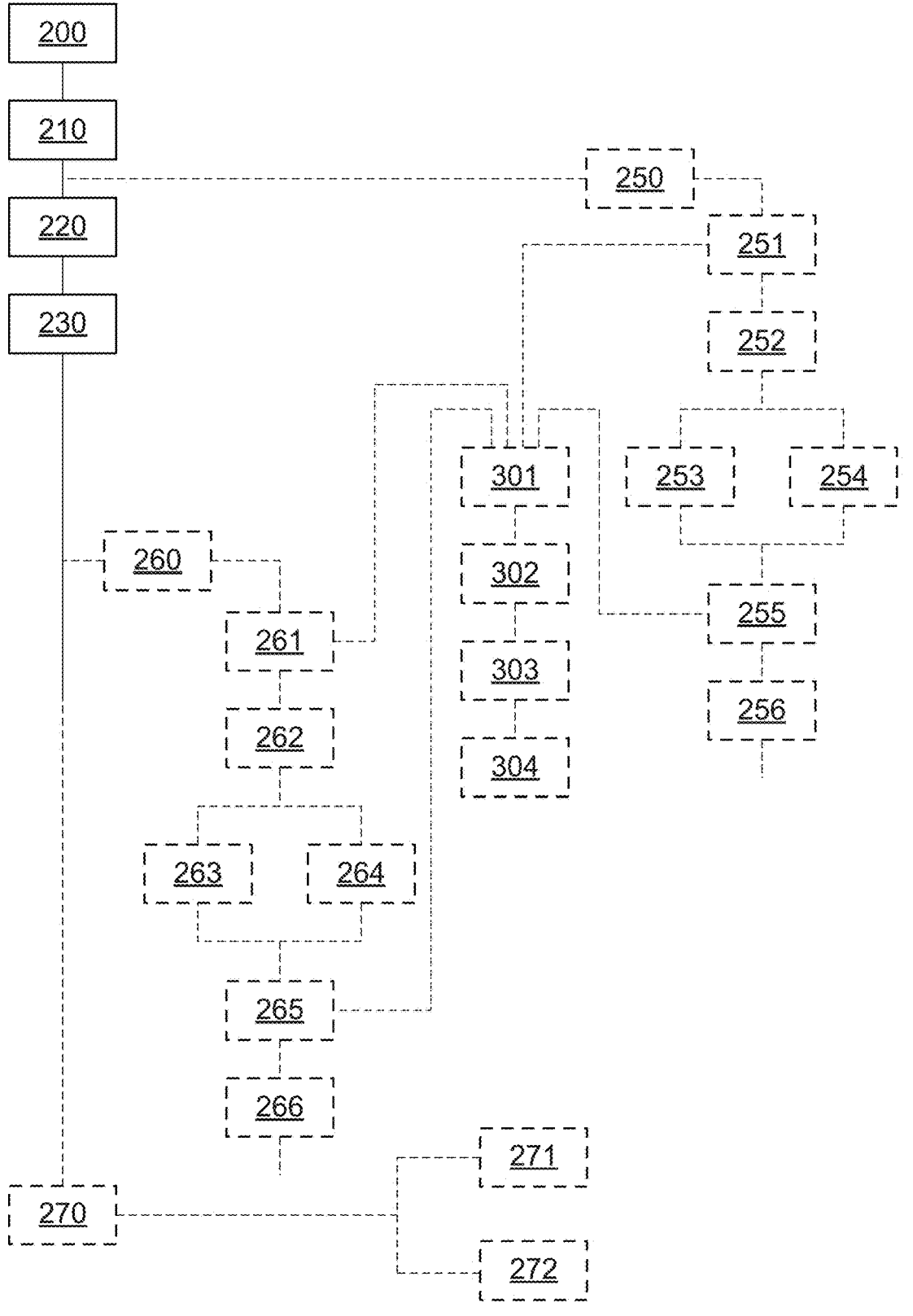
FIG. 10 is a block diagram of a method for controlling such an electrohydraulic system.

The controller 4 may also be connected to a memory or comprise a memory storing instructions or a calculator program for implementing a method for controlling an electrohydraulic system 1. FIG. 10 shows a block diagram of this method.

Firstly, the method comprises supplying 200 pressurized fluid to the distributors 164, 174 of the two hydraulic units 16, 17 via the pumps 162, 172 of these hydraulic units 16, 17. The pumps 162, 172 are activated by the controller 4 that controls the starting of the electric pump motors 163, 173. The pump 162, 172 of each hydraulic unit 16, 17 thus sucks the fluid contained in the reservoir 161, 171 of this hydraulic unit 16, 17 and discharges it to the distributor 164, 174 of this hydraulic unit 16, 17.

Figure 5:
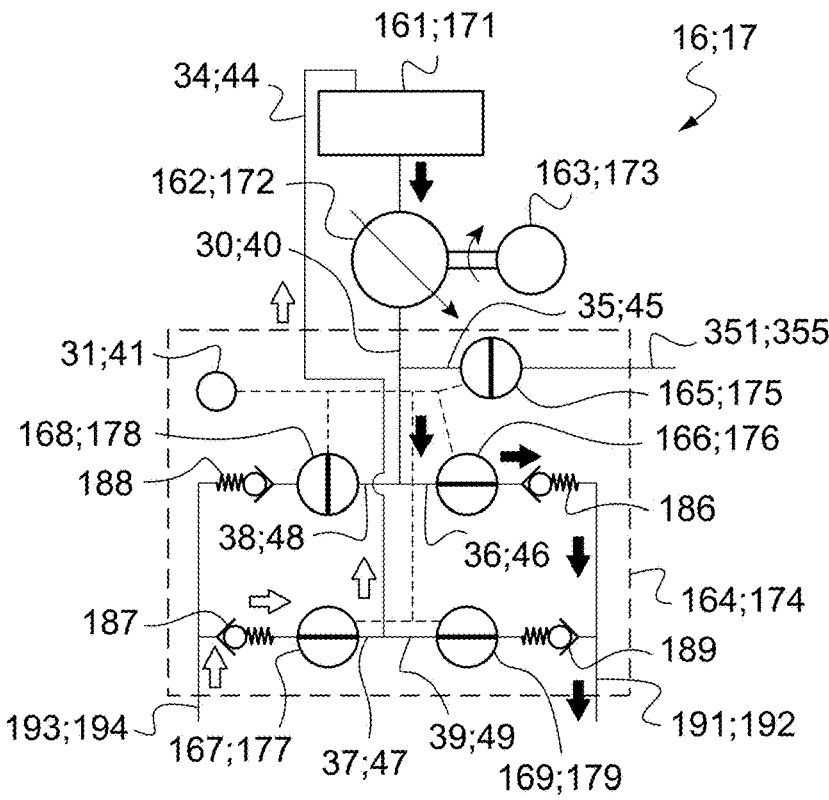

Then, an extension 210 of the movement devices 13, 14, 15 can be carried out in order to extend the landing gear units 21, 22, 23 from their respective housings 55, 56, 57, in accordance with FIG. 5. In this case, the controller 4 controls firstly the opening of the extension valves 166, 176 and the second discharge valves 167, 177 of the two hydraulic units 16, 17, and secondly the closing of the braking valves 165, 175 as well as the retraction valves 168, 178 and the first discharge valves 169, 179 of these two hydraulic units 16, 17. The fluid sucked into the reservoirs 161, 171 is thus directed into the extension chambers 136, 146, 156. Opening the second discharge valves 167, 177 allows the fluid contained in the retraction chambers 137, 147, 157 to be discharged into the reservoirs 161, 171.

Figure 6:
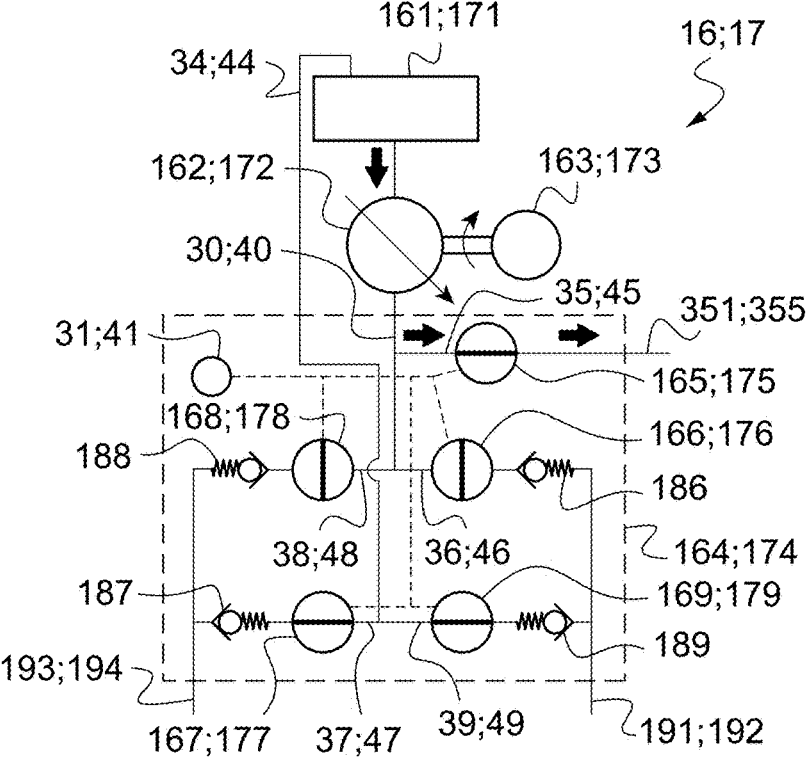

A supply 220 of the braking devices 11, 12 can then be carried out, in order to distribute the fluid contained in the reservoirs 161, 171 of the hydraulic units 16, 17 to the braking devices 11, 12, in accordance with FIG. 6. In this case, the controller 4 controls, firstly, an opening of the braking valves 165, 175 and, secondly, a closing of the extension 166, 176 and retraction 168, 178 valves. A greater or lesser speed of rotation of the pump 162, 172 may be controlled by controlling the speed of rotation of the electric pump motor 163, 173 according to the desired braking power.

Optionally, the controller 4 may control a closure of the discharge valves 167, 169, 177, 179, in particular if the landing gear 2 does not comprise a mechanical locking device in the extended position of the landing gear units 21, 22, 23. In this case, the electrohydraulic system 1 may comprise pressure relief valves in order to limit the hydraulic pressure in the event of an increase in temperature. If the landing gear 2 comprises such a mechanical locking device, the controller 4 can control either a closing or opening of the discharge valves 167, 169, 177, 179, the method for controlling an electrohydraulic system 1 comprising an intermediate step of locking the landing gear units 21, 22, 23 in the extended position using the mechanical locking device.

Figure 7:
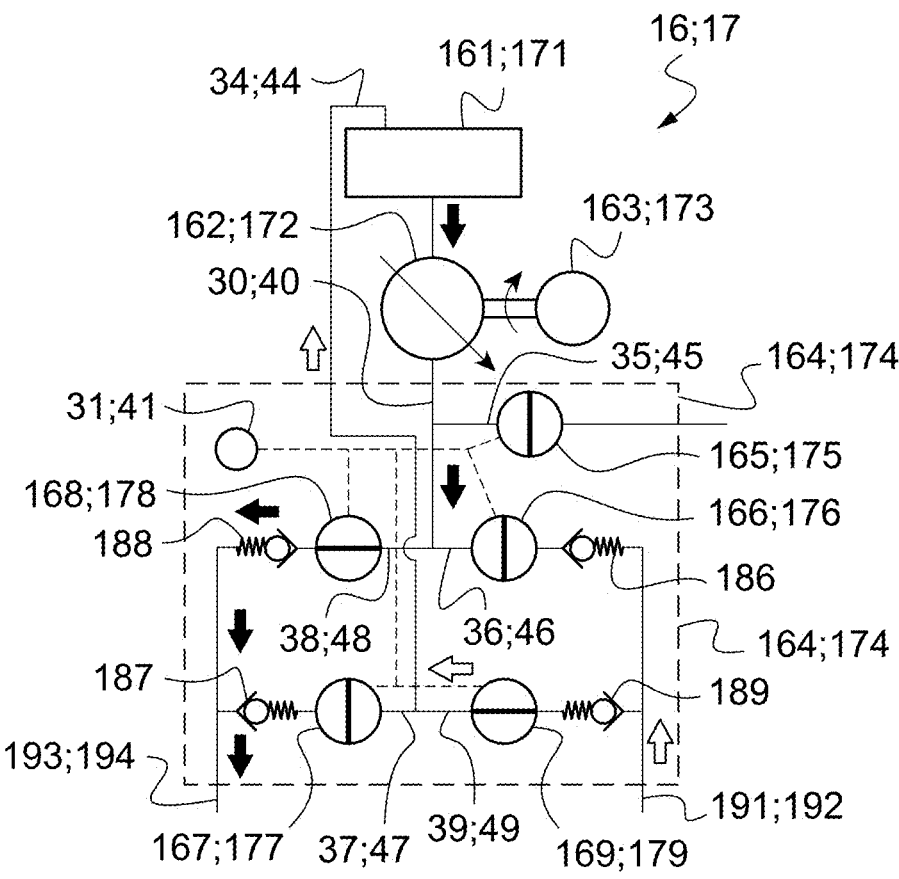

Finally, a retraction 230 of the movement devices 13, 14, 15 is carried out in order to retract the landing gear units 2 into their respective housings 55, 56, 57, in accordance with FIG. 7. In this case, the controller 4 controls, firstly, an opening of the retraction valves 168, 178 and the first discharge valves 169, 179 and, secondly, a closing of the braking valves 165, 175 as well as the extension valves 166, 176 and the second discharge valves 167, 177. The fluid sucked into the reservoirs 161, 171 is thus directed into the retraction chambers 137, 147, 157. Opening the first discharge valves 169, 179 allows the fluid contained in the extension chambers 136, 146, 156 to be discharged into the reservoirs 161, 171.

During the extension 210, retraction 230 and supply 220 steps of the braking devices 11, 12, the distributors 164, 174 of the two hydraulic units 16, 17 are controlled identically, the valves of these two distributors 164, 174 having the same states, namely open or closed.

After each of these steps, a nominal configuration 270 of the valves 165-169, 175-179 can be carried out in order to place the valves 165-169,175-179 in predetermined states. For example, a closure 271 of the extension valve 166, 176 and the retraction valve 168, 178, and an opening 272 of the braking valve 165, 175 and the first and second discharge valves 167, 169, 177, 179 are carried out.

Before this closing 271 and opening 272, the pumps 162, 172 are deactivated.

This setting to nominal configuration occurs, for example, once the extension or retraction of the landing gear units has been completed, or following the supplying of the braking devices. During or before this nominal configuration, the pumps 162, 172 of the two hydraulic units 16, 17 are deactivated.

In addition, with the particular aim of immobilizing the aircraft 2 on a parking area, a parking braking may be produced by first activating the pumps 162, 172 of the two units 16, 17, and by opening the braking valves 165, 175.

Once a required pressure of the fluid in the braking devices 11, 12 is reached, the braking valves 165, 175 are closed and the pumps 162, 172 are deactivated. In this case, the electrohydraulic system 1 may comprise one or more pressure relief valves in order to limit the hydraulic pressure, in particular in the braking lines 351-357 and the braking devices 11, 12, in the event of an increase in temperature.

In addition, the method may comprise post-extension balancing 250, carried out following the extension 210 of the movement devices 13, 14, 15. The purpose of this post-extension balancing 250 is to balance the amounts of fluid contained in the reservoirs 161, 171 of the hydraulic units 16, 17, as shown in FIG. 8.

This post-extension balancing 250 firstly comprises detecting 251, using one or more dedicated sensors, a first hydraulic unit 16 containing the largest amount of fluid among the two hydraulic units 16, 17, the other hydraulic unit 16, 17 being a second hydraulic unit 17.

Then, activating 252 the pump 162 of the first hydraulic unit 16. The controller 4 controls the starting of the electric pump motor 163 of this first hydraulic unit 16. The pump 172 of the second hydraulic unit 17 remains inactive. In this way, only the fluid contained in the reservoir 161 of the first unit 16 is sucked in and pressurized.

An opening 253 of the extension valve 166 and of the second discharge valve 167 of the first hydraulic unit 16, and of the first and second discharge valves 179, 177 of the second hydraulic unit 17, is then carried out. Simultaneously, a closure 254 of the retraction valve 168 and of the first discharge valve 169 of the first hydraulic unit 16, and of the extension 176 and retraction 178 valves of the second hydraulic unit 17, is carried out. This opening 253 and this closing 254 are controlled by the controller 4.

In the event that the distributors 16, 17 do not comprise the valves 186-189, the second discharge valve 177 of the second hydraulic unit 17 must be closed in order to allow post-extension balancing 250 to be carried out.

Then, it is detected 255 that the reservoirs 161, 171 of the first and second hydraulic units 16, 17 contain the same amount of fluid to within a margin. For example, the margin is equal to 5% of the maximum amount that each of the reservoirs 161, 171 can contain.

Finally, deactivation 256 of the pump 162 of the first hydraulic unit 16 is then carried out, via the controller 4 controlling the stopping of the electric pump motor 163 of this first hydraulic unit 16.

Similarly, the method may comprise post-retraction balancing 260, following the retraction 230, in order to balance the amounts of the fluid contained in the reservoirs 161, 171 of the hydraulic units 16, 17, as shown in FIG. 9.

This post-retraction balancing 260 firstly comprises detecting 261, with the one or more dedicated sensors, a first hydraulic unit 16 containing the largest amount of fluid among the two hydraulic units 16, 17, the other hydraulic unit 16, 17 being a second hydraulic unit 17.

Then, activating 262 the pump 162 of the first hydraulic unit 16. The controller 4 controls the starting of the electric pump motor 163 of this first hydraulic unit 16. The pump 172 of the second hydraulic unit 17 remains inactive. In this way, only the fluid contained in the reservoir 161 of the first unit 16 is sucked in and pressurized.

An opening 263 of the retraction valve 168 and of the first discharge valve 169 of the first hydraulic unit 16, and of the first and second discharge valves 179, 177 of the second hydraulic unit 17, is then carried out. Simultaneously, a closure 264 of the extension valve 166 and of the second discharge valve 167 of the first hydraulic unit 16, and of the extension 176 and retraction 178 valves of the second hydraulic unit 17, is carried out. This opening 253 and this closing 254 are controlled by the controller 4.

In the event that the distributors 16, 17 do not comprise the valves 186-189, the first discharge valve 179 of the second hydraulic unit 17 must be closed in order to allow post-extension balancing 250 to be carried out.

Then, it is detected 265 that the reservoirs 161, 171 of the first and second hydraulic units 16, 17 contain the same amount of fluid to within a margin.

Finally, deactivation 266 of the pump 162 of the first hydraulic unit 16 is then carried out, via the controller 4 controlling the stopping of the electric pump motor 163 of this first hydraulic unit 16.

The detections 251, 255, 261, 265 may be performed in a similar manner. For example, the detections 251, 255, 261, 265 may comprise a measurement 301 of the amounts of fluid contained in the reservoirs 161, 171 of the hydraulic units 16, 17. This measurement 301 may in particular be made by means of gauges measuring the amounts of fluid in each of the reservoirs 161, 171 or flow meters measuring the amounts of fluid entering and leaving each of the reservoirs 161, 171. The controller 4 can store these amounts in a memory.

A comparison 302 of these amounts is carried out by the controller 4.

Following this comparison, the controller 4 determines 303 the first hydraulic unit 16, for which the reservoir 161 contains the largest amount of fluid, the other hydraulic unit 16, 17 being the second hydraulic unit 17.

Following this comparison, the controller 4 can also determine 304 that the reservoirs 161, 171 of the hydraulic units 16, 17 contain the same amount of fluid to within the margin.

In addition, step 303 of determining the first hydraulic unit 16 may also take into account the margin. The first hydraulic unit 16 is then the unit 16, 17 for which the reservoir 161, 171 contains an amount of fluid greater than the sum of the amount of fluid contained in the reservoir 161, 171 of the other unit 16, 17 plus this margin.

Figure 11:
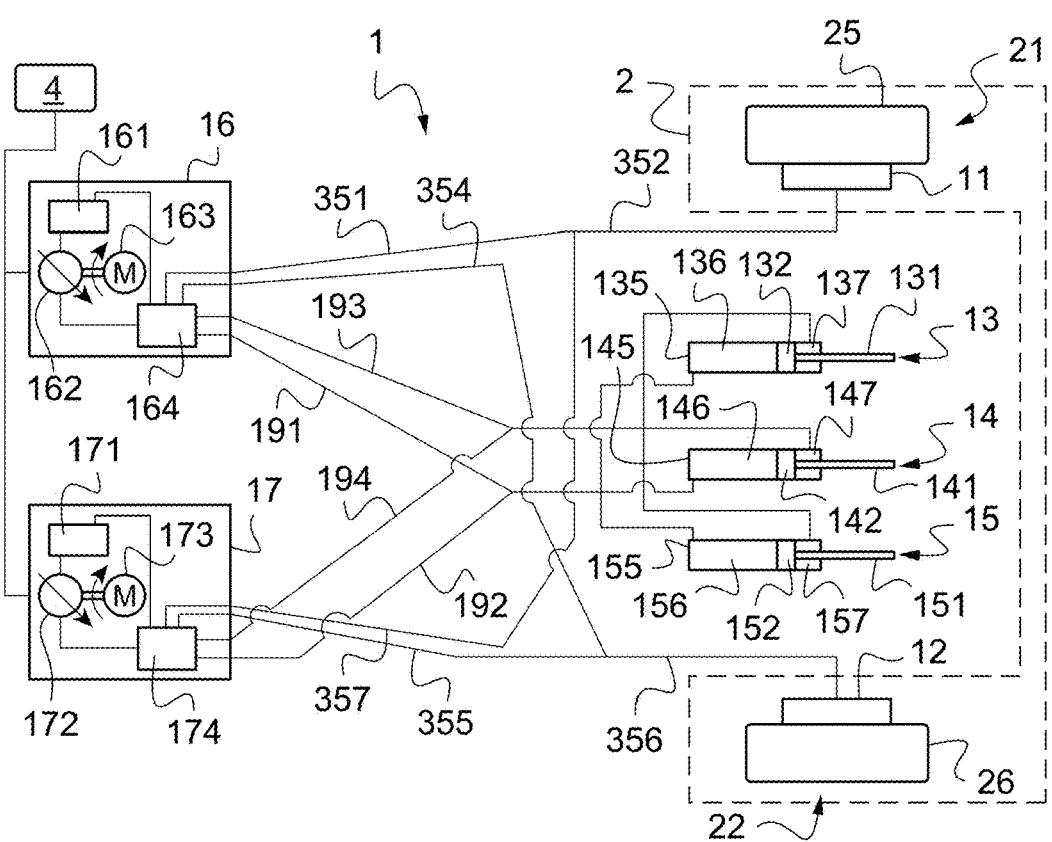
FIG. 11 shows a view of an electrohydraulic system for controlling a landing gear according to the disclosure.
Figure 12:
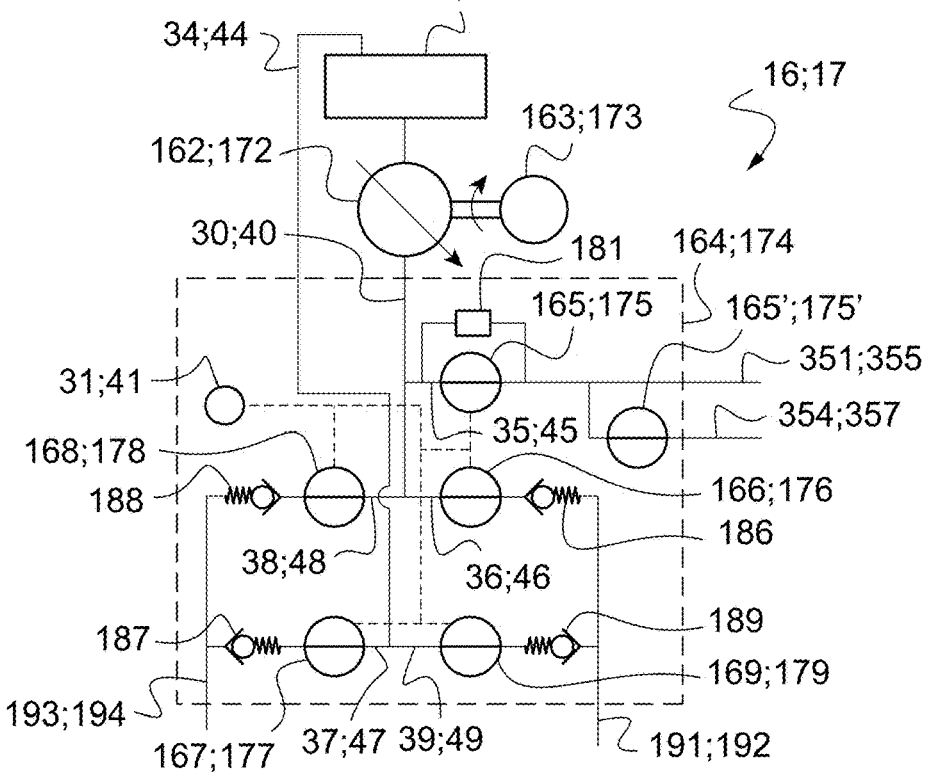
FIG. 12 shows a view of a distributor of the electrohydraulic system for controlling a landing gear of FIG. 11.

Furthermore, a variant of the electrohydraulic system 1 shown in FIG. 3 is shown in FIG. 11 and FIG. 12. According to this variant, the distributor 16, 17 comprises, in addition to the braking valve 165, 175, an emergency braking valve 165',175'. According to this variant, the first braking line 351 hydraulically connects the braking valve 165 of the first hydraulic unit 16 to the first braking device 11, and the second braking line 355 hydraulically connects the braking valve 175 of the second hydraulic unit 17 to the second braking device 12. In addition, a third braking line 354 hydraulically connects the emergency braking valve 165' of the first hydraulic unit 16 to the second braking device 12, and the fourth braking line 357 hydraulically connects the emergency braking valve 175' of the second hydraulic unit 17 to the first braking device 11.

In this way, when the two hydraulic units 16, 17 are fully operational, in order to brake the wheels 25, 26 of the landing gear units 21, 22, the pumps 162, 172 of the two hydraulic units 16, 17 are activated and the braking valves 165, 175 of the two hydraulic units 16, 17 are opened, the emergency braking valves 165', 175' of these two hydraulic units 16, 17 being kept closed. The two braking devices 11, 12 are thus supplied respectively and independently by the hydraulic units 16, 17 in a similar manner to the example shown in FIG. 1. In this case, differential braking of the two landing gear units 21, 22 is possible.

In the event of malfunction of one of the two hydraulic units 16, 17, for example the first hydraulic unit 16, in order to brake the wheels 25, 26 of the landing gear units 21, 22, the braking valve 165 and the emergency braking valve 165' of this defective first hydraulic unit 16 are closed or kept closed. This first defective hydraulic unit 16 thus does not supply any braking device 11, 12. In parallel, the pump 172 of the second, functional hydraulic unit 17 is activated and the braking valve 175 and the emergency braking valve 175' of this second, functional hydraulic unit 17 are opened. In this way, this second, functional hydraulic unit 17 supplies only the two braking devices 11, 12 enabling effective braking of the two landing gear units 21, 22 to be achieved. However, in this case of a defective first hydraulic unit 16, differential braking of the two landing gear units 21, 22 is not possible.

Moreover, in the context of this variant, a pressure relief valve 181 may be arranged in parallel with the braking valve 165, 175. In the event of malfunction of one of the two hydraulic units 16, 17, the pressure relief valve 181 can limit the increase in pressure in the braking circuit in the event of a change in temperature.

Finally, the electrohydraulic system 1 according to the disclosure advantageously enables failures within the distributor 164, 174 to be overcome and, in particular, a breakdown of one of the valves 165-169, 175-179.

For example, a leak at a retraction valve 168, 178 during the supply 220 of the braking devices 11, 12, will advantageously not cause a retraction of the landing gear units 21, 22, 23. Indeed, the retraction of the landing gear units 21, 22, 23 requires a significant pressure in the retraction chambers 137, 147, 157. However, in the presence or absence of the second valve 188, the fluid coming from the pump 162, 172 can pass through this defective retraction valve 168, 178, but will return at least in part to the reservoir 161, 171, via the open second discharge valve 167, 177, thus preventing excessive pressurization of the retraction chambers 137, 147, 157.

Similar behavior occurs in the event of a leak at an extension valve 166, 176 during the supply 220 of the braking devices 11, 12, the fluid returning to the reservoir 161, 171, via the first open discharge valve 169, 179.

Furthermore, the detection of these failures may be envisaged during a test carried out before landing of the aircraft 1. A pressurization of the circuit would make it possible to detect either an absence of flow, resulting in a high electrical consumption, in particular at the electric pump motor 163, 173, or a presence of a leakage flow.

In another example, a leak or even a break in an extension line 191, 192 or retraction line 193, 194 downstream of the distributor 164, 174 will not prevent the proper performance of braking, via the supply 220, including parking braking, due to the closed extension 166, 176 and retraction 168, 178 valves. Only the extension or retraction of the landing gear units could then not be carried out.

Similarly, a leak or even a break in the braking line 351, 352 would not prevent the extension or retraction of the landing gear units 21, 22, 23, the braking valve 165, 175 being closed in these cases. Moreover, the braking function can then be carried out on a single wheel 25, 26 using the hydraulic unit 16, 17 not concerned by this failure.

Finally, in the event of fluid communication between the supply lines 30, 40 and return lines 34, 44 of one of the hydraulic units 16, 17, a loss of the braking function controlled by this unit 16, 17 occurs, the other unit 16, 17 remaining functional in order to supply at least one of the two braking devices 11, 12. Similarly, this defective hydraulic unit 16, 17 will not be able to control an extension or a retraction of the landing gear units 21, 22, 23, but these operations will be able to be controlled by the other fully functional unit 16, 17.

In fact, due to the innovative architecture of the electro-hydraulic system 1 according to the disclosure, any failure upstream of a distributor 164, 174 of a hydraulic unit 16, 17 affects only the operation of this hydraulic unit 16, 17, the other hydraulic unit 16, 17 remaining fully functional to supply firstly at least one braking device 11, 12, and secondly the movement devices 13, 14, 15.

Naturally, the present disclosure may be subjected to numerous variations as to its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. An electrohydraulic system for controlling a landing gear of an aircraft, the landing gear comprising a plurality of retractable landing gear units each provided with at least one wheel, wherein the system comprises:

at least two braking devices for braking the wheel(s) of at least two landing gear units;

one movement device per landing gear unit, for moving a landing gear unit relative to a housing of the aircraft; and two hydraulic units, each of the two hydraulic units being hydraulically connected to the movement devices and to at least one of the braking devices, each hydraulic unit comprising a reservoir containing a fluid, as well as a pump driven by an electric pump motor and a distributor configured to distribute the fluid to the braking device(s) and to the movement devices.

2. The system according to claim 1, wherein the system comprises only two braking devices, that are hydraulically supplied respectively by the two hydraulic units.

3. The system according to claim 1, wherein the system comprises only two braking devices that are hydraulically supplied jointly by the two hydraulic units.

4. The system according to claim 1, wherein the landing gear comprises three landing gear units, and the two hydraulic units are hydraulically connected to the movement devices associated with the three landing gear units.

5. The system according to claim 1, wherein the movement devices each comprise a piston integral with a rod and a hollow cylinder, the cylinder comprising an extension chamber and a retraction chamber separated by the piston, the distributor of each of the hydraulic units comprises:

a braking valve, hydraulically connected to the pump of this hydraulic unit and to at least one of the braking devices, in order to distribute the fluid contained in the reservoir of this hydraulic unit to the braking device(s);

an extension valve, hydraulically connected to the pump of this hydraulic unit and to the extension chambers of the movement devices, in order to distribute the fluid contained in the reservoir of this hydraulic unit into the extension chambers;

a retraction valve, hydraulically connected to the pump of this hydraulic unit and to the retraction chambers of the movement devices, in order to distribute the fluid contained in the reservoir of this hydraulic unit into the retraction chambers;

a first discharge valve, hydraulically connected to the reservoir of this hydraulic unit and to the extension chambers of the movement devices, in order to discharge the fluid contained in the extension chambers into the reservoir of this hydraulic unit; and a second discharge valve, hydraulically connected to the reservoir of this hydraulic unit and to the retraction chambers of the movement devices, in order to discharge the fluid contained in the retraction chambers into the reservoir of this hydraulic unit.

6. The system according to claim 5, wherein the distributors comprise four check valves associated in series with the extension, retraction and discharge valves respectively.

7. The system according to claim 5, wherein the distributor comprises a single electric distribution motor controlling combined openings and closings of the braking, extension, retraction and discharge valves.

8. The system according to claim 5, wherein the distributor comprises a first electric control motor controlling opening and closing of the braking valve and a second electric control motor controlling combined openings and closings of the extension, retraction and discharge valves.

9. A method for controlling the electrohydraulic system according to claim 5, the method comprising the following steps:

supplying pressurized fluid to the distributor of each hydraulic unit by means of the pump of the respective hydraulic unit;

extending the movement devices, the braking valves being closed, the extension valves and the second discharge valves being open, the retraction valves and the first discharge valves being closed;

supplying the braking devices, the braking valves being open, the extension and retraction valves being closed; and retracting the movement devices, the braking valves being closed, the retraction valves and the first discharge valves being open, the extension valves and the second discharge valves being closed.

10. The control method according to claim 9, the method comprising a post-extension balancing carried out following the extension, in order to balance the amounts of the fluid contained in the reservoirs of the hydraulic units, the distributors comprising four check valves respectively associated, in series, with the valves;

the post-extension balancing comprising the following steps:

detecting a first hydraulic unit containing the largest amount of fluid from among the hydraulic units, the other hydraulic unit being a second hydraulic unit;

activating the pump of the first hydraulic unit;

opening the extension valve and the second discharge valve of the first hydraulic unit and the first and second discharge valves of the second hydraulic unit;

closing the retraction valve and the first discharge valve of the first hydraulic unit and the extension and retraction valves of the second hydraulic unit;

detecting that the reservoirs of the first and second hydraulic units contain the same amount of fluid to within a margin; and deactivating the pump of the first hydraulic unit.

11. The method according to claim 9, the method comprising post-retraction balancing, following the retraction, in order to balance the amounts of the fluid contained in the reservoirs of the hydraulic units, the distributors comprising four non-return valves respectively associated, in series, with the extension, retraction and discharge valves;

the post-retraction balancing comprising the following steps:

detecting a first hydraulic unit containing the largest amount of fluid from among the hydraulic units, the other hydraulic unit being a second hydraulic unit;

activating the pump of the first hydraulic unit;

opening the retraction valve and the first discharge valve of the first hydraulic unit and the first and second discharge valves of the second hydraulic unit;

closing the extension valve and the second discharge valve of the first hydraulic unit and the extension and retraction valves of the second hydraulic unit;

detecting that the reservoirs of the first and second the same amount of fluid to within a hydraulic units contain margin; and deactivating the pump of the first hydraulic unit.

12. The method according to claim 9, the detections comprising:

measuring the amounts of fluid contained in the reservoirs of the hydraulic units;

comparing the amounts;

determining the first hydraulic unit, the reservoir of which contains the most fluid; and determining that the reservoirs of the hydraulic units contain the same amount of fluid to within a margin.

13. The method according to claim 9, the method comprising a nominal configuring of the valves, the pumps being deactivated, the nominal configuration comprising:

closing the extension and retraction valves; and opening the braking valve and the first and second discharge valves.

14. An aircraft comprising a landing gear comprising at least two retractable landing gear units each provided with at least one wheel, the aircraft comprising the electrohydraulic system for controlling a landing gear according to claim 1.

* * * * *